428-407 GP
5/4/85 XR 35 31,907

United States Patent [19]

Poirier

[11] E Patent Number: Re. 31,907

[45] Reissued Date of Patent: Jun. 4, 1985

[54] TETRAFLUOROETHYLENE COPOLYMER FINE POWDER RESIN

[75] Inventor: Robert V. Poirier, Fairport, N.Y.

[73] Assignee: E. I. Du Pont de Nemours and Company, Wilmington, Del.

[21] Appl. No.: 925,886

[22] Filed: Jul. 18, 1978

Related U.S. Patent Documents

Reissue of:

[64] Patent No.: 4,036,802
Issued: Jul. 19, 1977
Appl. No.: 616,442
Filed: Sep. 24, 1975

[51] Int. Cl.[3] ..... C08L 27/18; C08F 259/08

[52] U.S. Cl. ..... 525/276; 525/902; 428/407

[58] Field of Search ..... 525/276, 902

[56] References Cited

U.S. PATENT DOCUMENTS

| | | | |
|---|---|---|---|
| 3,088,941 | 5/1963 | Uhland | 260/92.1 |
| 3,142,665 | 7/1964 | Cardinal et al. | 260/29.6 F |
| 3,170,858 | 2/1965 | Muehlberg et al. | 204/159.17 |
| 3,654,210 | 4/1972 | Kuhls et al. | 260/29.6 F |
| 3,769,252 | 10/1973 | Fuijii et al. | 260/32.8 R |
| 3,798,287 | 3/1974 | Murayama et al. | 260/878 R |
| 3,819,594 | 6/1974 | Holmes et al. | 260/87.3 A |
| 3,929,934 | 12/1975 | Moore et al. | 260/884 |
| 4,129,618 | 12/1978 | Downer et al. | 525/273 X |

FOREIGN PATENT DOCUMENTS

| | | |
|---|---|---|
| 654084 | 7/1965 | Belgium . |
| 1246834 | 9/1971 | United Kingdom . |

*Primary Examiner*—Carman J. Seccuro

[57] ABSTRACT

Good extrusion at high reduction ratios is obtained with a non-melt-fabricable tetrafluoroethylene fine powder resin whose particles have an inner portion and an outer portion, each portion being composed of a copolymer of tetrafluoroethylene and a selected comonomer, in which the comonomer content of the copolymer in the inner portion is greater than the comonomer content in the copolymer in the outer portion. Such particles are obtained by polymerizing tetrafluoroethylene and a desired amount of the selected comonomer in an aqueous dispersion medium, then lowering the amount of comonomer available, and continuing the polymerization.

8 Claims, No Drawings

TETRAFLUOROETHYLENE COPOLYMER FINE POWDER RESIN

Matter enclosed in heavy brackets [ ] appears in the original patent but forms no part of this reissue specification; matter printed in italics indicates the additions made by reissue.

FIELD OF THE INVENTION

This invention relates to dispersions of tetrafluoroethylene resins and fine powders suitable for paste extrusion obtained therefrom; and particularly to such dispersions and powders which contain a tetrafluoroethylene copolymer.

BACKGROUND OF THE INVENTION

Two types of polytetrafluoroethylene resins are available commercially, viz, granular resin and fine powder resin. Granular resin is made by polymerizing tetrafluoroethylene in an aqueous medium under conditions which cause the polymer to coagulate during the polymerization reaction to form particles which generally exceed 500 microns in diameter. The resin is then comminuted to smaller particle sizes, e.g., 30 to 100 microns, for molding by such techniques as preforming and sintering or for ram extrusion.

The fine powder resin is made by polymerizing tetrafluoroethylene in an aqueous medium under conditions which maintain the polymer dispersed as fine particles 0.05 to 0.5 micron in size in the medium until the polymerization reaction is completed. The particles in the aqueous dispersion can then be coagulated and dried, and are useful in this form for paste extrusion.

Two main differences between the processes for making these resins is that (a) stirring in the granular polymerization system is more vigorous than in the fine powder polymerization system, causing coagulation during the polymerization reaction and (b) sufficient dispersing agent is present in the fine powder polymerization system to maintain the polymer particles dispersed until the polymerization reaction is completed, whereas the amount, if any, of dispersing agent present in the granular polymerization system is insufficient to give this result.

Commercially available fine powder resins are not normally fabricable by commerical molding and ram extrusion processes used for granular resin; and granular resin is not fabricable by the paste extrusion techniques by which fine powder resin is most commonly processed.

The present invention arises in the field of fine powder the paste extrusion of these fine powder resins, the resin is blended with lubricant to form lubricated agglomerates which are precompacted and charged to an extruder barrel and extruded at about room temperature through a die with a cross-section much smaller than that of the barrel. The resulting extrudate is then heated to remove lubricant and usually sintered by heating to coalesce the residual resin into an integral mass. A common commercial fine powder paste extrusion application is extrusion onto a wire to insulate the wire. An adverse property of these fine powder resins is their tendency to develop shear faults or flaws when extruded as a coating onto the wire at high reduction ratios. (Reduction ratio is the ratio of the cross-sectional area of the extruder barrel to the cross-sectional area of the extruder die.) It has been found that each distinct fine powder resin has a certain maximum reduction ratio above which the resin tends to develop flaws as it is extruded. At higher ratios, the resin may actually shatter as it is sintered after it is extruded onto the wire. The reason for the appearance of flaws in the coating as the reduction ratio is increased is not entirely understood but is believed to be due to the shear stresses built up at the entrance to the die as the reduction ratio is increased. Resins capable of extrusion at high reduction ratios are desirable because the higher the ratio, the larger the barrel that can be used, permitting extrusion of longer continuous lengths of coated wire without reloading the barrel. Thus, the search for fine powder resins capable of extrusion onto wire at high reduction ratios and exhibiting few or no flaws after sintering is a continuing one.

The search is complicated by two facts. Firstly, many prior art reports of fine powder resins capable of being examination for flaws occurring during extrusion of beading—i.e., solid cylindrical extrudate—instead of on sintered wire coating. The former is a less sensitive test because flaws in the beading are detected by visual inspection, while flaws in wire coated for electrical use are found by electrically testing in order to detect much smaller flaws (whose detection is of importance in electrical applications). Thus, reports of prior art fine powder resins that can be used as high reduction ratios are frequently misleading because they are based on gross visual inspections. Secondly, fine powder resin coatings, as extruded on the wire, are unsintered and upon sintering the coated wire for enduse applications, additional flaws appear in the coating. But much of the past work, as evidenced by the prior art in this area, has not considered the flaws that appear during sintering and again has erroneously reported fine powder resins of good extrusion quality having high reduction ratios. In reality, however, because of the flaws appearing during sintering, useful reduction ratios of such resins produced by such past work are much lower.

In summary, in the past, the quality of a fine powder resin for paste extrusion has been measured by paste extruding unsintered beading and visually examining the beading for flaws. As a result, resins have been reported acceptable for extrusion onto wire at reduction ratios as high as 10,000:1. However, though the correlation of unsintered beading extrudate having few flaws and sintered wire coating extrudate having few flaws may be valid when resins are paste extruded at low reduction ratio (e.g., 1950:1 or less), the correlation breaks down when extrusion is carried out at higher reduction ratios. In other words, resins which the art has said are extrudable to produce acceptable unsintered beading at reduction ratios of over 1950, are, in reality, unacceptable to produce sintered wire coatings at the reduction ratios said to be acceptable. For example, Cardinal et al., U.S. Pat. No. 3,142,665, discloses fine powder resins that are said to produce acceptable unsintered beadings at reduction ratios of 10,000:1 or more; however, as shown in the Comparisons hereinbelow, resin produced according to the Cardinal et al. patent has numerous flaws when extruded and sintered on wire at a reduction ratio of only 1930:1. On the other hand, the Examples hereinbelow, e.g., Example 1, show the resins of this invention had few flaws when extruded and sintered on wire at a reduction ratio of 1930:1 and 2840:1.

SUMMARY OF THE INVENTION

In accordance with this invention, good extruded wire coatings are obtained at high reduction ratios with a fine powder resin whose particles have an inner portion and an outer portion, each portion being composed of a non-melt-fabricable copolymer of tetrafluoroethylene and a selected comonomer, in which the comonomer content of the copolymer in the inner portion is greater than the comonomer content in the copolymer in the outer portion. Such particles are obtained by polymerizing tetrafluoroethylene and a desired amount of the selected comonomer in an aqueous dispersion medium, then lowering the amount of comonomer available, and continuing the polymerization. Most conveniently, lowering the amount of comonomer available is carried out simply by venting unreacted monomers from the reaction autoclave and repressuring the autoclave with tetrafluoroethylene, which, upon restarting the polymerization, polymerizes with residual comonomer. This aspect of the polymerization will sometimes be referred to hereafter as the vent-repressure step.

Specifically, the compositions of this invention are:

1. An aqueous polymer dispersion comprising a dispersion of non-felt-fabricable tetrafluoroethylene polymer particles in water at a solids content of between about 10 and about 65 weight percent; said particles having an average size of between about 0.1 and 0.5$\mu$; said particles having at least two portions, an outer portion and an adjacent inner portion, each portion consisting essentially of a copolymer of units of tetrafluoroethylene and at least one comonomer having the formula

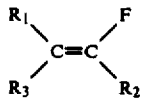

(a)

wherein $R_1$ independently is F or H;

$R_2$ independently is F or Cl;

$R_3$ can be Cl, $-R_F$, $-OR_F$, $-R'_FH$, $-OR'_FH$, $-OR'_FCl$, $-R'_FCl$ or $$-OCF_2\underset{\underset{CF_3}{|}}{C}FO(CF_2)_2SO_2F,$$

wherein $R_F$ is linear perfluoroalkyl of 1-5 carbon atoms, and $R'_F$ is linear perfluoroalkylene (perfluorinated alkane diradical) of 1-5 carbon atoms in which the designated substituent is an omega substituent; and when $R_2$ is F, $R_1$ and $R_3$ taken together can be

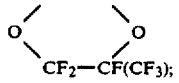

or the formula

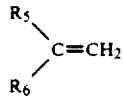

(b)

wherein $R_5$ and $R_6$ are independently $-CF_3$ or $-CClF_2$; said inner copolymer portion containing a higher percentage of said comonomer than the outer copolymer portion; the total comonomer content present in the particle, the percentage of comonomer present in the copolymer of each portion, and the amount of each portion with such particles being sufficient to produce on AWG 22 wire a sintered coating having no more than 5 flaws per 100 meters of coated wire when said particles are paste extruded at a reduction ratio of 2840:1, the flaws being detected by subjecting the sintered coated wire to a high voltage spark tester at 2KV and 300 Hz.

2. A tetrafluoroethylene fine powder resin obtained by coagulating the particles from the dispersion described above. Generally, the coagulated particles are agglomerates of the smaller primary particles in the aqueous dispersion, for the coagulated particles usually have an average size between about 350$\mu$ and about 800$\mu$.

The process aspect of the invention is a process for preparing an aqueous dispersion of tetrafluoroethylene polymer particles which comprises 1. subjecting tetrafluoroethylene and at least one comonomer of the formula

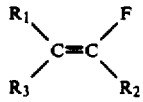

(a)

wherein $R_1$ independently is F or H;

$R_2$ independently is F or Cl;

$R_3$ can be Cl, $-R_F$, $-OR_F$, $-R'_FH$, $-OR'_FH$, $-OR'_FCl$, or $-R'_FCl$ or $$-OCF_2\underset{\underset{CF_3}{|}}{C}FO(CF_2)_2SO_2F,$$

wherein $R_F$ is linear perfluoroalkyl of 1-5 carbon atoms, and $R'_F$ is linear perfluoroalkylene (perfluorinated alkane diradical) of 1-5 carbon atoms in which the designated substituent is an omega substituent; and when $R_2$ is F, $R_1$ and $R_3$ taken together can be

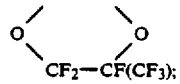

or the formula

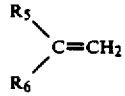

(b)

wherein $R_5$ and $R_6$ are independently $-CF_3$ or $-CClF_2$; wherein the mole ratio of the amount of the comonomer to the tetrafluoroethylene is between about 0.0005 and about 0.05, to polymerizing conditions of temperature and pressure in an aqueous medium having dissolved therein a free-radical initiator and a dispersing agent and at an agitation level of from between about 2 to 12 joules/sec.-l. until the polymer solids content is between about 20 and 50% of the weight of the resulting dispersion, 2. subjecting the aqueous dispersion obtained in step (1) to tetrafluoroethylene and said comonomer in a mole ratio of comonomer to tetrafluoroethylene of between about 0.0001 and 0.005 provided said ratio is less than that in step (1) under polymerizing conditions of temperature and pressure and at an agitation level of from between about 2 to 12 joules/sec.-l. until the solids content is between about 35 and 65% of the weight of the resulting dispersion and is at least about 15% greater than the solids content of the dispersion obtained in step (1).

In one aspect of the invention, the polymerization in step (a) occurs in the presence of very small particles, e.g. about 0.03 to 0.12$\mu$ in average size, of tetrafluoroethylene homopolymer. Thus in such an instance, the fine powder particles produced will contain a small core of tetrafluoroethylene homopolymer.

By the term "non-melt-fabricable" is meant a tetrafluoroethylene polymer whose melt viscosity is so high that the polymer cannot be easily extruded by melt fabrication techniques. Generally the lower the molecular weight of the copolymer, the lower the melt viscosity. A melt viscosity above which tetrafluoroethylene polymers are non-melt-fabricable is $1\times10^9$ poises. The melt viscosity is measured as described under Specific Melt Viscosity found below.

DESCRIPTION OF THE INVENTION

The comonomers used herein are represented by the formula

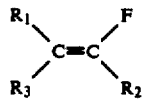

wherein $R_1$, $R_2$ and $R_3$ are defined as recited above. Preferably $R_1$ and $R_2$ are fluorine. Preferably also $R_3$ is $-R_F$ or $-OR_F$. Representative comonomers include hexafluoropropylene, perfluoroheptene-1, perfluoromethyl vinyl ether, perfluoropropyl vinyl ether, perfluoropentyl vinyl ether, the omega (w) hydrogen or chloro analogs of the foregoing comonomers, dichlorodifluoroethylene, perfluoro(2-methylene-4-methyl-1,3-dioxolane), and the like. Preferably $R_3$ is $-OR_F$, viz, monomers of the formula $F_2C{=}CFOR_F$. These perfluoro (alkyl vinyl)ethers when used as the comonomer generally result in polymer particles having very high thermal stability and although the thermal stability of all the copolymers used herein is good, the ether-containing copolymers can be sintered with good results at higher temperatures and therefore can be processed at greater oven speeds then can other copolymers.

Generally, to obtain good extrudability, the comonomer content in the particles will be between 0.005 and 2% by weight, based on weight of the copolymer. The preferred amount will be smaller if the molecular weight of the comonomer increases.

The particles of the invention are produced by polymerizing tetrafluoroethylene and comonomer in stages whereby each portion of copolymer produced, after the first, is attached to and instantly associated with the copolymer portion produced during the preceding stage. This sequential stage-by-stage polymerization produces particles of the invention when the comonomer content is varied from stage-to-stage as described herein.

Polymerization of tetrafluoroethylene and comonomer in both stages is generally carried out in accordance with known procedures. Thus, monomer pressures of 1 to 1000 atmospheres may be employed, although it is generally preferred to employ pressures from 1 to 75 atmospheres and most preferably 20–30 atmospheres, since otherwise expensive high pressure equipment is required to handle the monomer safely. The reaction temperature is maintained at a temperature ranging from 0° to about 100° C., preferably 50°–95° C. Higher temperatures can be employed if the pressure is sufficiently high to maintain the reaction medium, i.e., the water, in the liquid phase. Cooling of the reaction mixture is generally required, since the polymerization is exothermic.

A wide variety of free radical initiators may be employed in the present invention, particularly water soluble organic and inorganic peroxides. Examples include disuccinic acid peroxide, diglutaric acid peroxide, monopersuccinic acid, and ammonium persulfate, among others. Preferred initiators are ammonium persulfate and disuccinic acid peroxide. Redox polymerization initiators such as sodium bisulfite with ferricitrophosphates may also be employed as polymerization initiators in the present invention. The quantity of the initiator may be varied over a wide range depending on the polymerization rate and degree of polymerization desired; but generally from 0.0005% to 0.5% of initiator by weight of the water is present.

The ratio of water to monomer in the process of the present invention is not critical but is merely a matter of choice depending upon the size of the vessel and other obvious factors. In general, the water is usually present on a weight basis ina ratio of greater than one part of water per part of monomer and preferably 1.5 to 25 parts of water per part of monomer. The water should be free of oxygen and chlorine and preferably should be demineralized.

A dispersing agent is present in the polymerization mixture in order to ensure the production of an aqueous dispersion. The dispersing agent used in the polymerization may be any suitable water-soluble ionizable dispersing agent which will permit the production of aqueous dispersions of colloidal polymeric tetrafluoroethylene. Some of the most desirable dispersing agents are those compounds having a solubility of water of at least 0.1% at 100° C. and comprising an ionic hydrophilic portion and a hydrophobic portion, said latter being a highly fluorinated radical containing at least 6 aliphatic carbon atoms. Such dispersing agents are disclosed in U.S. Pat. No. 2,559,752, issued to K. L. Berry. Since high specific melt viscosity resins are to be made in this invention, the dispersing agents should be non-telogenic, which means that they are not sufficiently active as chain transfer agents to reduce the melt viscosity of the copolymer prepared below the desired level.

Examples of the preferred dispersing agents are those water-soluble salts from the group consisting of alkali metal, ammonium and substituted ammonium salts of a polyfluoroalkanoic acid having the general formula $B(CF_2)_nCOOH$, wherein B is from the group consisting of hydrogen and fluorine and n is an integer from 6 to 20 inclusive. Preferably B is fluorine. Specific examples include potassium hexadecafluorononanoate, ammonium eicosafluoroundecanoate, ammonium hexadecafluorononanoate, potassium eicosafluoroundecanoate, sodium dodecafluoroheptanoate, ammonium perfluoropelargonate, sodium perfluorocaproate, ammonium perfluorocaprylate, and the like. Mixtures of two or more dispersing agents are also suitable for use in this invention.

The amount of the dispersing agent used is not particularly critical and may vary, for example, from 0.01 to 10% by weight of the water used. If it is desired to increase the average resin particle size dispersing agent can be added in increments during the polymerization in the first stage according to the following program: Add at least 0.001 weight percent dispersing agent before 2 weight percent of polymer solids are formed; use an average of 0.002 to 0.05 weight percent dispersing agent during the formation of the first 4 weight percent of polymer solids, and use in excess of 0.05 weight percent dispersing agent during the period in which the polymer solids exceeds 10 weight percent. Weight percents are based on water.

Other components of the polymerization mixture which may be present include an initiator activating agent. As the initiator activating agent, there may be added, although such is not essential to the polymerization, a small quantity of powdered iron as described in U.S. Pat. No. 2,750,350, issued to A. E. Kroll, June 12, 1956. The iron powder, commercially available as reduced iron powder, being essentially pure iron free from oxidation products, can be added to increase the rate of polymerization when employed in combination with peroxides. When employed, the quantity of the iron used is generally less than 10 p.p.m. by weight of the water present.

It is also preferred in making the more concentrated dispersion of this invention to employ a coagulation inhibitor which can be one of the saturated hydrocarbons as described in U.S. Pat. No. 2,612,484 issued to G. S. Bankoff. As pointed out in the Bankoff patent, these hydrocarbons are efficient stabilizing agents against coagulation of the polymer and permit agitation of the reactants without danger of coagulating the polymer. These hydrocarbon anticoagulants also help to sequester and remove any coagulated polymer which separates from the aqueous medium. The saturated hydrocarbon compounds which are suitable for this purpose include those which have more than 12 carbon atoms and are liquid under polymerization conditions. Specific examples include octadecane, eicosane, tetradecane, cetane, mixtures of hydrocarbons commonly known as white oils and paraffin waxes, liquid at the polymerization temperature. These hydrocarbons can be added to the aqueous medium before polymerization in proportions of about 0.1 to 12% by weight based on the water present.

The agitation speed is dependent upon the autoclave and agitator dimensions. Howevere, it can be generally classified as mild. For example, an agitation speed of 30–60 r.p.m. is appropriate for a 36,250 cc. horizontal autoclave having a length-to-diameter ratio of about 1.5 to 1 and provided with a four bladed cage-type agitator running the length of the autoclave. In general, the degree of agitation during the polymerization of either stage may be between about 2 and 12 joules/sec.-l., preferably 8–12.

To prepare the resin particles of this invention, tetrafluoroethylene and comonomer can be introduced (e.g., pressured) into the reaction vessel (e.g., an autoclave). Either may be instructed first or both may be added simultaneously. In addition, the monomers can be added in several increments during the course of the polymerization. However added, the total amount of monomers present during the first stage of the polymerization should be sufficient to result in a copolymer containing between about 0.005 and 2.0%, preferably 0.02 to 0.20% by weight comonomer content. In terms of partial pressure, the comonomer content in the reaction vessel during this stage should be between about 0.05 and 5.0 percent, preferably 0.5 to 1.5% of the total pressure in the autoclave (which is equivalent to a mole ratio of the amount of comonomer to tetrafluoroethylene of 0.0005 to 0.05). Of course, the specific amounts of comonomer employed will depend on the proportion of units derived from its desired in the copolymer, on the particular comonomer used, and on the polymerization conditions employed.

In one embodiment, the comonomer is not added until up to about 15% of the tetrafluoroethylene has been polymerized. Resins produced by this procedure according to this invention are frequently white and opaque when extruded onto wire.

Polymerization to make the portion of the copolymer that is adjacent to the outer portion is carried out until the polymer solids content of the aqueous reaction mixture is between about 20 and 50% by weight based on the weight of the mixture and until the amount of tetrafluoroethylene is copolymerized form amounts to about 25–85%, preferably 65–75%, by weight of the total amount desired in polymerized form. Stirring is then stopped, and most of the monomer mixture is removed. Removal is ordinarily accomplished by simply venting the reaction vessel until the pressure in the vessel is between about atmospheric pressure and up to about one-half the polymerization pressure used in this stage of the polymerization.

The resulting aqueous dispersion is then treated to another polymerization by subjecting it to tetrafluoroethylene monomer and comonomer (preferably, but not necessarily, the same comonomer used in the previous stage of the polymerization) in amounts such that the comonomer content in the copolymer produced in this stage is less than the comonomer content in the copolymer produced in the previous stage. Generally the amount of comonomer is the copolymer produced in this stage (i.e., in the preparation of the outer layer of the particle) should be less than one-half, preferably less than one-fifth and most preferably less than one-tenth, the amount in the previous stage copolymer. Generally, also, the amount of the comonomer present will be an amount sufficient to obtain good few-flaw extrudates mentioned previously. For example, when perfluoro(propyl vinyl ester) is the comonomer, the amount present in copolymerized form in the copolymer of this last stage should be less than 0.005 mol percent. The minimum amount of the comonomer present in the vessel, regardless of whether the copolymer of this last stage is obtained by the vent-repressure step, is an amount required to produce a mole ratio of comonomer to tetrafluoroethylene of at least about 0.0001. For hexafluoroethylene the minimum amount will be slightly greater. Preferably, the minimum amount wil be about 0.0002.

Polymerization of this last stage is then carried out under the conditions recited hereinabove until the amount of tetrafluoroethylene is polymerized form in the previous stage represents from about 25 to about 85% of the total polymerized tetrafluoroethylene in the particle. Usually at this point the total solids is at least about 15% greater than it was at the end of the previous stage, and preferably is about 25-35% greater.

Upon completion of this last stage of the polymerization, the resulting aqueous dispersion is ordinarily passed into a wax separator where the dispersion is cooled to allow separation of the coagulation inhibitor. The aqueous dispersion can be employed as such for use in dip coating or impregnating applications. The number average size of the resin particles in the aqueous dispersion is between about 0.1 and 0.5μ. Thus, the resin is in a colloidal state. The resin particles in the aqueous dispersion can be coagulated by subjecting the dispersion to high shear agitation or by other known methods. Suitable agitation power is from about 16 to about 160 joules/sec.-l. the resin particles agglomerate during coagulation to form agglomerates having a weight average size of between about 350μ and about 800μ. The coagulated particles are then separated and dried by ordinary procedures.

A second method for coagulation, which can be used to impart improved handling properties to the resin, utilizes a modified version of the vessel described in Example 2 of U.S. Pat. No. 2,593,583. The four equidistantly spaced baffles are shortened to extend from the bottom of the cone to approximately half the height of the vessel and a second agitator, similar to the single agitator but without the blades being pitched, is added approximately half way from the bottom of the agitator shaft to the top of the vessel. In this vessel, coagulation is carried out with the dispersion temperature between 20°-30° C., the dispersion solids level between 15-20%, and with the agitator speed between 330-600 rpm, depending upon the agglomerate particle characteristics desired.

The fine powder resins of this invention can be paste extruded at higher reduction ratios than fine powder resins of the prior art to produce sintered coatings of the resin on wire having fewer flaws in the coating per length than could the fine powder resins hitherto available. The Examples which follow illustrate the invention, and the Comparisons which follow compare the products and process of the invention with ones outside the scope of the invention. In the Examples, the standard specific gravity (SSG), specific melt viscosity (MV), average dispersion particle size and comonomer content are determined as follows:

Standard Specific Gravity (SSG)

SSG is a means of indirectly measuring the molecular weight of a tetrafluoroethylene polymer. Generally, the lower the SSG, the higher the molecular weight. It is determined by the ratio of weight in air to weight of an equal volume of water at 23° C. of a specimen prepared in a standard manner. In the standard specimen preparation, a 12 gram sample of dry resin powder is leveled between aluminum foils, in a cylindrical mold 2.73 cm. in diameter, and pressure is gradually applied during about 30 seconds to a final pressure of about 352 kg./cm.$^2$, which is held for two minutes. The resulting preform is baked in an air oven at 380° C. for 30 minutes after heating from 290° to 380° C./min., cooled at 294° C. at a rate of 1° C. per minute, removed from the oven, and then conditioned for 3 hours at 23° C.

Specific Melt Viscosity

To obtain specific melt viscosity, the rate of elongation is measured for a small strip of resin in creep under a known tensile stress. 12 G. of fine powder resin is placed in a 7.6 cm. diameter mold between 0.152 cm. rubber cauls and paper spacers. The mold is then heated at 100° C. for 1 hour. Pressure is then slowly applied on the mold until a value of 140.6 kg./cm.$^2$ is obtained. This pressure is held for 5 minutes and then released slowly. After the sample disc is removed from the mold and separated from the cauls and paper spacers, it is sintered at 380° C. for 30 minutes. The oven is then cooled to 290° C. at a rate of about 1° C. a minute and the sample is removed. A crack-free rectangular sliver with the following dimensions is cut: 0.152 to 0.165 cm. wide, 0.152 to 0.165 cm. thick, and at least 6 cm. long. The dimensions are measured accurately and the cross-sectional area is calculated. The sample sliver is attached at each end to quartz rods by wrapping with silver-coated copper wire.

The distance between wrappings is 4.0 cm. This quartz rod-sample assembly is placed in a columnar oven where the 4 cm. test length is brought to a temperature of 380±2° C. A weight is then attached to the bottom quartz rod to give a total weight suspended from the sample sliver of about 4 g. The elongation measurements vs. time are obtained, and the best average value for the slope of the creep curve in the interval between 30 and 60 minutes is measured. The specific melt viscosity is then calculated from the relationship.

$$n = \frac{WL_T g}{3(dL_T/dt)A_T}$$

where n = specific melt viscosity in shear, poises w = tensile load on sample, g.

$L_T$ = length of sample (at 380° C.) cms. (length increases about 8% at 380° C. over that at room temperature).

g = gravitational constant, 980 cm./sec.$^2$ $(dL_T/dt)$ = rate of elongation of sample under load-slope of elongation vs. time plot, cm./sec.

$A_T$ = cross-sectional area of sample (at 380° C.), cm.$^2$ (area increases about 37% at 380° C. over that at room temperature).

Average Dispersion Particle Size

The average size of particles in the dispersion is determined by a relationship based on light-scattering theory from the percentage of incident light transmitted at 546 millimicron wavelength through a unit measure of a dilute dispersion. Dispersion as received is filtered through cheesecloth. Then 5 ml of the filtrate is diluted to 500 ml in a volumetric flask. Some of the diluted dispersion is used to fill a silica cell with a 1 cm path length. For dispersions with particles sizes between 0.17 to 0.26μ, $$\text{average dispersion particle size} = \frac{0.272A}{SG\left(\frac{S}{100}\right)} + .065$$

where

A = absorbance relative to water

SG = specific gravity of the dispersion as received

S = % solids of the dispersion as received

These particle size values are in the theory nearly equal to the weight-average particle size as confirmed by ultracentrifuge analysis, and are further in reasonable agreement with those determined directly by examination of electron micrographs of the particles at 20,000 diameters magnification.

Average Coagulated Fine Powder Particle Size, $d_{50}$

The average particle size of coagulated fine powder is determined as follows: A weighed sample of polymer is placed on the top screen of an assembly of screens which is then tapped manually with a leather hammer. The weight of sample retained on each screen is determined and the fraction of the original sample retained on each screen is plotted vs. screen opening on a log probability chart and a smooth curve is drawn between the points. The $d_{50}$ particle size is read at the 50% value printed on the chart.

Comonomer Content in the Fine Powder Copolymers

The vinyl ether content of fine powder resins of the present invention can be determined by infrared analysis. A representative procedure is as follows: A 1.75 g. sample of dry fine powder resin is leveled between pieces of aluminum foil in a cylindrical mold, 2.86 cm. inside diameter. A pressure of 703 kg./cm.$^2$ is applied for one minute at ambient temperature. The pressed crack-free sample, which is about 0.127 cm. thick, is then analyzed by infrared spectroscopy. The sample is scanned from 9.6 to 11.4 microns. When the vinyl ether is perfluoro(propyl vinyl ether), a straight base line is drawn from the absorbance minimum at 9.9 microns to that at 11.25 microns. Then the ratio of (1) the absorbance from the base line to the minimum at 10.1 microns to (2) the absorbance from the base line to the absorbance at 10.7 microns is obtained, and the actual weight percent perfluoro(propyl vinyl ether) is determined by the product of the ratio of absorbances and the factor, 0.14. This factor can be used for absorbance ratios up to at least 1.0. An analogous procedure may be used for other vinyl ethers, or an estimate can be made based on reactivity. The hexafluoropropylene content is found from the product of 0.3 and the ratio of absorbances in the infrared of a cold-pressed sample of the resin 0.05 cm. thick, at 10.18 microns to the infrared absorbance of the sample at 10.7 microns. An analogous procedure is used for other fluoroolefins.

For chlorotrifluoroethylene comonomer the absorbance at 10.48$\mu$ and 10.70$\mu$ is measured and the weight percent chlorotrifluoroethylene is determined by the produect of the ratio of absorbances and the factor 0.052.

Extrusion Performance

The performance of a resin of this invention is evaluated by end use testing using a tetrafluoroethylene paste extruder, either a Davis Electric Co. extruder or a Jennings extruder. The resin sample is rolled with a hydrocarbon lubricant (viz, "Isopar" H which is an isoparafinic hydrocarbon boiling between 350° and 375° F.) at the desired lubricant level for 30 minutes, and then stored at 25° C. for at least 4 hours. The mixture is then performed in a cylinder around a rod of the same diameter as the wire guide so that the preform will conveniently fit over the wire guide in the extruder barrel. The Davis extruder was fitted with barrels of 50.8 mm. and 68.5 mm., a die of 1.40 mm. diameter and 16.0 mm. land length, with a cone angle of 30° and 9.5 mm. and 15.9 mm. mandrels, respectively. The wire used was 19/34 silver-coated, stranded copper having an overall diameter of 0.79 mm. The reduction ratio for the two barrels is 1930:1 and 2840:1, respectively.

The wire guide has an internal diameter of 0.89 mm. and an external diameter of 1.24 mm. The guide tip clearance is 2.03 mm. The die temperature is maintained at 50° C. and the wire speed is 23 meters per minute. Linear ram speeds used during extrusion for the Davis extruder were 1.7 cm./min. at 1930:1 ratio and 1.0 cm./min. at 2840:1 reduction ratio. The coated wire passes through five ovens set at 232°, 260°, 454°, 427° and 399° C., respectively. The number of defects occuring in the finished wire is determined by passing the wire through a series of high voltage spark testers set progressively at voltages of 2, 5, and 8 KV. These testers use alternating current with a 3000 Hz sine wave.

The Jennings extruder has a 7.62 cm. barrel and a 22.2 mm. mandrel is used with the samme cone and die setup for extrusion on AWG 22 wire at a 3990:1 reduction ratio. Linear ram speed was 0.42 cm/min. at 3990 reduction ratio. Wire speed was 15 meters/min. All other values and conditions are the same as for the Davis extruder for extrusion on AWG 22 wire at a 3990:1 reduction ratio.

The results for each resin of the Examples are shown in Table II where the number of flows in 100 meters of extruded sintered resin on wire is shown for voltages of 2, 5 and/or 8 KV. The column "lube (weight percent)" in Table II indicates the amount of hydrocarbon lubricant based on the total weight of lubricant and resin prior to extrusion. "Press (kg/cm$^2$)" records the extrusion pressure employed and "Length (meters)" indicates the total length of wire that was examined for flaws.

The following Examples illustrate the invention while the Comparisons compare the resins of the invention with resins of the art.

EXAMPLE 1

The following polymerizaton reaction was conducted: A horizontally disposed, water/steam jacketed, cylindrical stainless-steel autoclave located in a barricade and having a capacity of 36,240 cc. and a length-to-diameter ratio of about 1.5 to 1, and provided with a 4-bladed cage-type agitator rotated at 46 r.p.m. and running the length of the autoclave, was evacuated and then charged with 855 grams of paraffin wax, 21.8 kg. of dimineralized water, and 2.0 grams of ammonium perfluorocaprylate (C-8 APFC) dispersing agent. The autoclave was then heated to 65° C., evacuated, and purged with tetrafluoroethylene, after which 0.77 g. ammonium persulfate initiator (APS) dissolved in water was added. Then 18 ml. of perfluoropropyl vinyl ether (PPVE) was added, and the autoclave was pressured over a period of about 2 minutes to 29.2 kg./cm.$^2$ absolute with tetrafluoroethylene (TFE). Stirring rate and temperature were maintained until polymerization started as evidenced by 0.7 kg./cm.$^2$ drop in pressure. The temperature was immediately raised to 70° C. where it was maintained throughout the polymerization. Additional TFE was then added to maintain the reaction pressure at 29.2 kg./cm.$^2$ until a dispersion of approximately 35 percent solids content (total polymer plus aqueous medium basis) was obtained. After about 1140 grams of TFE had been fed following start of the reaction (4.4 percent solids formed), 860 ml. of 3.1 percent by weight, aqueous solution of C-8 APFC was injected into the autoclave to stabilize the dispersion.

After 7,720 ($W_1$) gms. of the TFE had been fed following start of the reaction, the TFE feed to the autoclave was terminated and the agitator stopped. Approximately five minutes after discontinuing the TFE feed, the gaseous monomers were slowly vented (taking approximately ten minutes) from the autoclave until the autoclave pressure reached automospheric pressure. Then the agitator was again turned on, the autoclave pressured with TFE, and the reaction started a second time. Then 2,270 ($W_2$) grams of additional TFE was fed, the monomer fed to the autoclave was then terminated, and the pressure was allowed to decrease to 12.3 kg./cm.$^2$ before agitation was stopped and the vapor space of the reactor was vented. The polymerization time from the first start-up to the second time the agitator was turned off was 91 minutes. The reaction rate (space time yield) was 391 g/l-hr. The resulting dispersion was discharged and cooled, after which the supernatant solid paraffin wax was removed, and the dispersion was diluted, brought to a pH of 8 to 9 by addition of ammonium hydroxide, and coagulated by the procedure of Example 2 of U.S. Pat. No. 2,593,583 to Lontz. In this coagulation procedure, the aqueous dispersion is charged to a coagulation kettle and diluted to about 15% polymer solids. Agitation was then commenced at 18 joules/sec.-l. of dispersion at a temperature of 72° F. After a jelly-like mass of coagulum was obtained, stirring was continued for seven minutes. The coagulated fine powder was separated and dried for 16 hours at 150° C. This coagulation and drying procedure is generally used for all the resins described in the Examples.

The dispersed resin of this example had an average particle diameter of 0.18 micron. The coagulated resin had 16% by weight of its particles larger than 500μ, 50% larger than 355μ and 82% larger than 250μ. The coagulated particles had an SSG of 2.165, and a specific melt viscosity of $0.5\times10^{10}$ poises at 380° C. Infrared analysis showed the presence of 0.06 weight percent PPVE in the resin. Polymerization conditions and properties of the resin obtained are summarized in Table I.

Extrusion performance on AWG 22 wire was excellent. With a 5.08 cm. barrel and 1.40 mm. die (1930:1 RR) (18¼ percent Isopar H), the flaw count per 100 meters was zero flaws at a voltage of 2 KV, less than 1 flaw at 5 KV, and less than 4 8 KV. With a 6.35 cm. diameter barrel and 1.40 mm. die (2840:1 RR), (19¼, 19, 18¾ percent Isopar H), the flaw count per 100 meters was zero flaws at a voltage of 2 KV, less than 1 flaw at a voltage of 5 KV and less than 11 flaws at a voltage of 8 KV.

The extrusion conditions and flaw count data are summarized in Table II.

EXAMPLE 2

The polymerization procedure of Example 1 was followed except for those changes noted in Table I. The most significant change was the initial addition of comonomer after 1360 grams of TFE had polymerized. The properties of the resin obtained are listed in Table I. As with the resin of Example 1, the extrusion performance on AWG 22 wire using a 5.08 cm. barrel (1930:1 RR) was excellent, as seen in Table II by the few flaws occuring. From this experiment, it may be concluded that the good results with respect to flaws are not dependent upon the presence of comonomer during the nucleation step of the polymerization (approximately the first 5% by weight of conversion) nor upon the necessity of having comonomer present within a small core (<12 weight percent) of the resin particle.

EXAMPLES 3 and 4

Instead of venting the PPVE-TFE gas phase to atmospheric pressure (1.0 kg./cm.$^2$ absolute) as was done in Examples 1 and 2, the gases were vented to 1.8 kg./cm.<absolute (Example 3) and 2.8 kg./cm.$^2$ absolute (Example 4). Otherwise, the steps of Example 1 were followed, but using the amounts, times and pressures shown in Table I. The quantity of comonomer remaining in the autoclave after the intermediate vent and repressure is of course increased over that in Example 1 by a factor of 1.8 (Example 3) and 2.8 (Example 4). Comparing Examples 1, 3 and 4, it is seen from Table II that as the amount of comonomer units present in the outer stage increases, more flaws are observed in the wire coated product, but the product of Example 4 still produces a product with few flaws.

EXAMPLES 5-7

In these Examples, the general procedure of Example 1 was employed, using the conditions and amounts shown in Table I. The results, as seen in Table II, show that few flaws are obtained while varying the volume of the inner portion relative to the volume of the particle. The size of the inner portion, denoted in Table I by $W_1/W_1+W_2$, ranges from about 82% of the particle in Example 5 to about 9% in Example 7.

EXAMPLE 8

In this Example, the general procedure of Example 1 was employed, using the conditions and amount shown in Table 1. More PPVE per part of TFE was used than in any previous Examples, as seen by the greater amount of comonomer present in the particles prepared (0.15%). This increased amount had no adverse effect in view of the few number of flaws observed on sintered coated wire as seen from Table II.

EXAMPLES 9-12

Following the procedure of Example 1 and using the conditions, times, and amounts shown in Table I, resins having few flaws when extruded and sintered onto wire were obtained as seen in Table II when: hexafluoropropylene, HFP, was used as the comonomer in place of PPVE (Example 9); a different initiator, disuccinic peroxide, DSP, was used (Example 10); chlorotrifluoroethylene, CTFE, was used as the comonomer in place of PPVE (Example 11); and perfluoro methyl vinyl ether, PMVE, was used as the comonomer in place of PPVE (Example 12).

COMPARISON A

The polymerization procedure of Example 1 was generally used except that no vent-repressure step was carried out. 11,800 grams of TFE was fed following start of the polymerization into the autoclave which contained 20.9 kg. of demineralized water, using a pressure of 27 kg/cm$^2$. Then the monomer feed to the autoclave was terminated, and the pressure was allowed to decrease to 12 kg./cm.$^2$ before agitation was stopped and the vapor space of the reactor was vented. The polymerization time from start of the reaction to the time when the agitator was turned off was 101 minutes. The reaction rate (space time yield) was 400 g./l-hr. The dispersed resin had an average particle diameter of 0.18 micron. The coagulated resin had an SSG of 2.164, and a specific melt viscosity of $0.6\times10^{10}$ poises at 380° C. Infrared analysis showed the presence of 0.10 weight percent PPVE in the resin. Polymerization conditions and properties of the resin obtained are summarized in Table I.

The fine powder resin obtained produced a continuous bending extrudate, requiring a steady state extrusion pressure of 270 kg./cm.$^2$. However, as seen in Table II, extrusion on AWG 22 wire using a 5.08 cm. barrel (1930:1 RR) was unsuccessful. With lubricant levels of 18 and 18½ percent Isopar H, the flaws at a voltage of 2 KV were continuous. Comparing Example 1 with this Comparison A, it is seen that an improved PPVE modified fine powder is obtained through venting the TFE and PPVE monomers, and repressuring and continuing the polymerization with TFE feed as described in Example 1.

COMPARISON B

The polymerization procedure generally used in Example 2 was followed except the TFE and PPVE were not vented until completion of the polymerization. Conditions, times, amounts and resin properties are shown in Table I. When compared with the resin of Example 2, the resin of this Comparison B has poor extrusion properties, as witnessed by the high number of flaws shown in Table II.

COMPARISONS C and D

In these comparisons, no comonomer was used. Thus the polymer resins prepared were polytetrafluoroethylene homopolymer resins. In Comparison C, the general procedure of Example 1 was followed, but after venting, more tetrafluoroethylene monomer was pressured into the autoclave which originally did not contain any comonomer. In Comparison D, the general procedure of Comparison A was followed and no vent-repressure step was carried out. The conditions, times and amounts employed are shown in Table I. The poor flaw count results in Table II measured at 8 KV show that the vent-repressure step has no advantageous effect on the resins consisting solely of homopolymer.

COMPARISON E, F and G

These comparisons show that using the comonomers without a vent-repressure step, i.e., by using the general procedure of Comparison A, and using the conditions, times and amounts shown in Table I, resins having a high number of flaws when extruded and sintered on wire are obtained (see Table II). These results are to be compared with the results of the Examples as follows: For HFP comonomer, Example 9 is compared with Comparison E; for CTEF comonomer, Example 11 is compared with Comparison F; and for PMVE comonomer, Example 12 is compared with Comparison G.

COMPARISON H

The general procedure of Comparison A was employed, using the conditions, times and amounts set forth in Table I. The conditions for this experiment were those chosen by selecting a set of conditions from within the scope of U.S. Pat. No. 3,142,665 which produces a particularly high quality product from among those disclosed in said U.S. Pat. No. 3,142,665 for extrusion onto wire at high reduction ratios. As seen from Table II, more flaws were found in the sintered coating of a wire of the resin produced in this Comparison H than were found in sintered coatings on wire of resins of this invention, e.g., the resins of Examples 9 or 1.

TABLE I

Polymerization Conditions and Resin Properties

| Example No. | Initiator (g) | Comonomer (ml) | Temp (°C.) | Pressure (kg/cm$^2$) | $W_1$ (g) | $W_2$ (g) | Rxn. Time (min) | Rxn. Rate (g/l-hr) |
|---|---|---|---|---|---|---|---|---|
| 1 | 0.33 APS | 18 PPVE | 70 | 29 | 7,720 | 2,270 | 91 | 391 |
| 2 | 0.55 APS | 18 PPVE[1] | 70 | 29 | 8,630 | 2,720 | 108 | 310 |
| 3 | 0.77 APS | 18 PPVE | 70 | 22-27[2] | 7,710 | 3,180 | 92 | 320 |
| 4 | 0.77 APS | 18 PPVE | 70 | 22-27[2] | 7,710 | 3,180 | 86 | 350 |
| 5 | 0.77 APS | 18 PPVE | 70 | 29 | 8,170 | 1,815 | 97 | 400 |
| 6 | 0.55 APS | 18 PPVE | 70 | 29 | 3,630 | 7,720 | 73 | 520 |
| 7 | 0.33 APS | 40 PPVE | 70 | 29 | 910 | 9,080 | 108 | 250 |
| 8 | 0.33 APS | 40 PPVE | 70 | 22-27[2] | 7,710 | 3,180 | 122 | 250 |
| 9 | 0.55 APS | 30 HFP[1] | 70 | 29 | 8,630 | 2,720 | 102 | 370 |
| 10 | 52.5 DSP[3 4] | 12 PPVE | 100 | 22-29[2] | 7,710 | 3,180 | 191 | 160 |
| 11 | 1.76 APS | 10.2 CTFE[5] | 60 | 26 | 7,710 | 3,180 | 71 | 420 |
| 12 | 1.76 APS | 4.8 PMVE[6] | 50 | 26 | 7,710 | 3,180 | 309 | 100 |
| Comparison | | | | | | | | |
| A | 0.33 APS | 18 PPVE | 70 | 27 | 11,800 | — | 101 | 400 |
| B | 0.55 APS | 18 PPVE[1] | 70 | 29 | 11,350 | — | 85 | 440 |
| C | 0.77 APS | — | 70 | 22-27[2] | 7,710 | 3,180 | 88 | 340 |
| D | 0.77 APS | — | 70 | 22-27[2] | 9,260 | — | 46 | 550 |
| E | 0.55 APS | 30 HFP[1] | 70 | 29 | 9,580 | — | 70 | 400 |
| F | 1.76 APS | 14.4 CTFE[5] | 60 | 26 | 10,900 | — | 40 | 750 |
| G | 1.76 APS | 7.2 PMVE[6] | 60 | 26 | 10,900 | — | 236 | 130 |
| H | 10.5 DSP[4] | 25 HFP | 90 | 29 | 9,700 | — | 119 | 260 |

| Examp. No. | Average Dispersion Size (μ) | Std Sp Gr | Specific MV (poise × $10^{-10}$) | Comonomer (wt %) | Average Steady State Extrusion Pressure[7] (kg/cm$^2$) | $\frac{W_1}{W_1 + W_2}$ |
|---|---|---|---|---|---|---|
| 1 | 0.18 | 2.165 | 0.5 | 0.06 | 770 | 0.77 |
| 2 | 0.22 | 2.168 | 1.3 | 0.05 | 680 | 0.76 |
| 3 | 0.24 | 2.172 | 0.7 | 0.06 | 500 | 0.71 |

TABLE I-continued

| Polymerization Conditions and Resin Properties | | | | | | |
|---|---|---|---|---|---|---|
| 4 | 0.23 | 2.167 | 0.9 | 0.06 | 460 | 0.71 |
| 5 | 0.20 | 2.157 | 0.6 | 0.08 | 670 | 0.82 |
| 6 | 0.20 | 2.166 | 1.8 | 0.02 | 620 | 0.32 |
| 7 | 0.19 | 2.152 | 2.5 | 0.03 | 620 | 0.09 |
| 8 | 0.17 | 2.156 | 2.5 | 0.15 | 870 | 0.71 |
| 9 | 0.23 | 2.178 | 2.2 | 2.13 | 550 | 0.76 |
| 10 | 0.18 | 2.243 | 1.0 | 0.06 | 750 | 0.71 |
| 11 | 0.26 | 2.227 | 4.1 | 0.04 | 450 | 0.71 |
| 12 | 0.18 | 2.217 | 5.9 | 0.01–0.03 | 800 | 0.71 |
| Comparison | | | | | | |
| A | 0.18 | 2.164 | 0.6 | 0.10 | 270 | 1.0 |
| B | 0.21 | 2.167 | 1.0 | 0.04 | 500 | 1.0 |
| C | 0.27 | 2.225 | 11.5 | — | 520 | 0.71 |
| D | 0.26 | 2.216 | 8.4 | — | 530 | 1.0 |
| E | 0.23 | 2.175 | 2.3 | 0.15 | 640 | 1.0 |
| F | 0.23 | 2.254 | 1.5 | 0.06 | 440 | 1.0 |
| G | 0.22 | 2.225 | 3.7 | 0.01–0.03 | 430 | 1.0 |
| H | 0.17 | 2.199 | 2.4 | 0.11 | 580 | 1.0 |

[1]Comonomer charged after 1360 g TFE reacted.
[2]Pressure maintained at 22 kg/cm² until 680 g TFE reacted.
[3]After APFC pumped, 500 ml DSP solution (35 g/l) pumped at 25 ml/min.
[4]0.044 g reduced iron and 0.044 g powdered copper added to charge.
[5]0.6 ml CTFE (−40° C.) charged after each 450 g TFE reacted prior to vent.
[6]0.3 ml PMVE (−40° C.) charged after each 450 g TFE reacted prior to vent.
[7]U.S. Pat. No. 3,819,594 - Column 5, lines 35–67.

TABLE II

Extrusion Performance
AWG 22 Wire, 1.40 mm Die

| | Davis Extruder 5.08 cm Barrel 1930:1 RR | | | | | | Davis Extruder 6.35 cm Barrel 2840:1 RR | | | | | |
|---|---|---|---|---|---|---|---|---|---|---|---|---|
| Example No. | Lube (wt %) | 2KV (Flaws/100M) | 5KV (Flaws/100M) | 8KV (Flaws/100M) | Press. (kg/cm²) | Length (meters) | Lube (wt %) | 2KV (Flaws/100M) | 5KV (Flaws/100M) | 8KV (Flaws/100M) | Press. (kg/cm²) | Length (meters) |
| 1 | 18½ | 1 | 3 | 11 | | 300 | 19¼ | 0 | 1 | 4 | 1110 | 240 |
| | 18¼ | 0 | 0 | 3 | 1000 | 300 | 19 | 0 | 1 | 11 | 1110 | 250 |
| | 18 | 1 | 1 | 3 | | 260 | 18¾ | 0 | 1 | 8 | 1130 | 110 |
| 2 | 18½ | 0 | 1 | 8 | 850 | 270 | | | | | | |
| | 18¼ | 1 | 1 | 7 | 880 | 280 | | | | | | |
| | 18 | 2 | 2 | 10 | 920 | 240 | | | | | | |
| 3 | 18½ | 1 | 1 | 9 | 670 | 200 | | | | | | |
| | 18¼ | 1 | 1 | 9 | 660 | 230 | | | | | | |
| | 18 | 1 | 2 | 8 | 680 | 210 | | | | | | |
| 4 | 18½ | 2 | 2 | 16 | 630 | 260 | 18½ | 2 | 2 | 15 | 810 | 300 |
| | 18¼ | 1 | 1 | 20 | 620 | 240 | 18 | 1 | 1 | 7 | 880 | 300 |
| | 18 | 2 | 3 | 21 | 650 | 240 | 17½ | 0 | 0 | 8 | 940 | 160 |
| 5 | | | | | | | 19¼ | 0 | 3 | C | 1000 | 180 |
| | | | | | | | 19 | 2 | 5 | C | 1050 | 240 |
| | | | | | | | 18¾ | 1 | 3 | 13 | 1130 | 230 |
| 6 | 18½ | 0 | 1 | 15 | 740 | 280 | 19¼ | 1 | 2 | 11 | 950 | 400 |
| | 18¼ | 1 | 1 | 6 | 770 | 310 | 19 | | | | 980 | |
| | 18 | 0 | 1 | 6 | 800 | 250 | 18¾ | 3 | 5 | C | 1060 | 290 |
| 7 | 18½ | 1 | 2 | 9 | | 290 | 19¼ | 5 | 8 | C | 1000 | 220 |
| | 18¼ | 1 | 2 | 12 | 820 | 320 | 19 | 2 | 5 | C | 1020 | 230 |
| | 18 | 3 | 4 | 14 | | 250 | 18¾ | 1 | 4 | C | 1040 | 85 |
| 8 | 18½ | 0 | 0 | 3 | 1030 | 240 | | | | | | |
| | 18¼ | 0 | 1 | 3 | 1100 | 320 | | | | | | |
| 9 | 18½ | 0 | 1 | 5 | 670 | 270 | | | | | | |
| | 18¼ | 1 | 1 | 2 | 690 | 280 | | | | | | |
| | 18 | 1 | 1 | 3 | 740 | 250 | | | | | | |
| 10 | 18½ | 0 | 1 | 7 | 1000 | 240 | | | | | | |
| | 18¼ | 0 | 1 | 8 | 1080 | 300 | | | | | | |
| | 18 | 0 | 0 | 6 | 1100 | 220 | | | | | | |
| 11 | 17½ | 1 | 4 | C | 650 | 250 | | | | | | |
| | 17 | 0 | 1 | C | 700 | 140 | | | | | | |
| 12 | 18½ | 2 | 3 | C | 1040 | 240 | | | | | | |
| | 18¼ | 0 | 0 | 14 | 1070 | 290 | | | | | | |
| | 18 | 0 | 0 | 14 | 1110 | 220 | | | | | | |
| COMPARISON | | | | | | | | | | | | |
| A | 18½ | C* | | | 560 | 330 | | | | | | |
| | 18¼ | | | | | | | | | | | |
| | 18 | C | | | 630 | | | | | | | |
| B | 18½ | C | | | 560 | 260 | | | | | | |
| | 18¼ | C | | | 600 | 270 | | | | | | |
| | 18 | C | | | 630 | | | | | | | |
| C | 18½ | 1 | 2 | C | 680 | 280 | | | | | | |
| | 8¼ | 2 | 4 | C | 710 | 310 | | | | | | |
| | 18 | 1 | 2 | C | 750 | 220 | | | | | | |

TABLE II-continued

| | Extrusion Performance AWG 22 Wire, 1.40 mm Die | | | | | | | | | | | |
|---|---|---|---|---|---|---|---|---|---|---|---|---|
| | Davis Extruder 5.08 cm Barrel 1930:1 RR | | | | | | Davis Extruder 6.35 cm Barrel 2840:1 RR | | | | | |
| Example No. | Lube (wt %) | 2KV (Flaws/100M) | 5KV (Flaws/100M) | 8KV (Flaws/100M) | Press. (kg/cm²) | Length (meters) | Lube (wt %) | 2KV (Flaws/100M) | 5KV (Flaws/100M) | 8KV (Flaws/100M) | Press. (kg/cm²) | Length (meters) |
| D | 18½ | 0 | 1 | C | 740 | 280 | | | | | | |
| | 18¼ | 1 | 1 | C | 780 | 300 | | | | | | |
| | 18 | 1 | 1 | C | 810 | 220 | | | | | | |
| E | 18½ | 14 | 14 | C | 700 | 300 | | | | | | |
| | 18¼ | 12 | 13 | C | 740 | 310 | | | | | | |
| | 18 | C | C | C | 770 | 260 | | | | | | |
| F | 17½ | C | | | 630 | 260 | | | | | | |
| | 17 | C | | | 670 | 240 | | | | | | |
| G | 18½ | | | | | | | | | | | |
| | 18¼ | C | | | 660 | 310 | | | | | | |
| | 18 | C | | | 660 | 240 | | | | | | |
| H | 18½ | 2 | 5 | C | 700 | 280 | 19¼ | C | | | 850 | 360 |
| | 18¼ | 1 | 1 | C | 700 | 300 | 19 | C | | | 920 | 400 |
| | 18 | 1 | 1 | C | 770 | 260 | 18¾ | C | | | 950 | 290 |

*Greater than 15 flaws/100m.

The embodiments of the invention in which an exclusive property or privilege is claimed are defined as follows:

[1. An aqueous polymer dispersion comprising a dispersion of non-melt-fabricable tetrafluoroethylene polymer particles in water at a solids content of between about 10 and about 65 weight percent; said particles having an average size of between about 0.1 and 0.5μ; said particles having at least two portions, an outer portion and an adjacent inner portion, each portion consisting essentially of a copolymer of units of tetrafluoroethylene and at least one comonomer having the formula

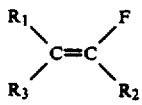

(a)

wherein $R_1$ independently if F or H;

$R_2$ independently is F or Cl;

$R_3$ can be Cl, $-R_F$, $-OR_F$, $-R'_FH$, $-OR'_FH$, $-R'_FCl$, $-OR'_FCl$, or $$-OCF_2\underset{\underset{CF_3}{|}}{C}FO(CF_2)_2SO_2F,$$

Wherein $R_F$ is linear perfluoroalkyl of 1-5 carbon atoms, and $R'_F$ is linear perfluoroalkylene (perfluorinated alkane diradical) of 1-5 carbon atoms in which the designated substituent is an omega substituent; and when $R_2$ is F, $R_1$ and $R_3$ taken together can be

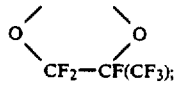

or the formula

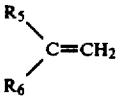

(b)

wherein $R_5$ and $R_6$ are independently $-CF_3$ or $-CClF_2$; said inner copolymer portion containing a higher percentage of said comonomer than the outer copolymer portion; the total comonomer content present in the particle, the amount of comonomer present in the copolymer of each portion, and the amount of each portion within such particles being sufficient to produce on AWG 22 wire a sintered coating having no more than 5 flaws per 100 meters of coated wire when said particles are paste extruded at a reduction ratio of 2840:1, the flaws being detected by subjecting the sintered coated wire to a high voltage spark tester at 2 KV and 3000 Hz; the copolymers of the inner portion and the outer portion combined containing an amount of comonomer which is low enough to maintain the non-melt-fabricable nature of the polymer particles.]

[2. The aqueous polymer dispersion of claim 1 wherein the comonomer is $F_2C{=}CFCF_3$.]

[3. The aqueous polymer dispersion of claim 1 wherein the comonomer is $F_2C{=}CFOR_F$.]

[4. The aqueous polymer dispersion of claim 1 wherein thee comonomer is $F_2C{=}CFCl$.]

[5. The aqueous polymer dispersion of claim 2 wherein the copolymers of the inner portion and the outer portion combined contain between about 0.005 and about 2.0 weight percent comonomer units based on total weight of said particles.]

[6. The aqueous polymer dispersion of claim 1 wherein the tetrafluoroethylene in polymerized form in the inner portion comprises between about 25% and 85% by weight of the total tetrafluoroethylene polymerized in the inner and the outer portions.]

[7. The aqueous polymer dispersion of claim 1 wherein said particles contain a core of polytetrafluoroethylene of up to 15% by weight based on the weight of the particle.]

[8. The aqueous polymer dispersion of claim 7 wherein the comonomer is $F_2C{=}CFCF_3$.]

[9. The aqueous polymer dispersion of claim 8 wherein the comonomer is $F_2C{=}CFOR_F$.]

[10. The aqueous polymer dispersion of claim 8 wherein the comonomer is $F_2C{=}CFCl$.]

11. An agglomerated fine powder resin whose agglomerated particles have an average size of between about 350μ and 800μ and are composed of primary particles [defined as provided in the definition of the particles in claim 1] *having an average size of between about 0.1 and 0.5μ; said particles having at least two portions, an outer portion and an adjacent inner portion, each portion consisting essentially of a copolymer of units of tetrafluoroethylene and at least one comonomer having the formula*

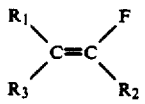

(a)

*wherein*

*$R_1$ independently is F;*

*$R_2$ independently is F;*

*$R_3$ is Cl; said inner copolymer portion containing a higher percentage of said comonomer than the outer copolymer portion; the total comonomer content present in the particle, the amount of comonomer present in the copolymer of each portion, and the amount of each portion within such particles being sufficient to produce on AWG 22 wire a sintered coating having no more than 5 flaws per 100 meters of coated wire when said particles are paste extruded at a reduction ratio of 2840:1, the flaws being detected by subjecting the sintered coated wire to a high voltage spark tester at 2 KV and 300 Hz; the copolymers of the inner portion and the outer portion combined containing an amount of comonomer which is low enough to maintain the non-melt-fabricable nature of the polymer particles.*

[12. An agglomerated tetrafluoroethylene fine powder resin whose agglomerated particles have an average size of between about 350μ and 800μ and are composed of primary particles of claim 2.]

[13. An agglomerated tetrafluoroethylene fine powder resin whose agglomerated particles have an average size of between about 350μ and 800μ and are composed of primary particles defined as provided in the difinition of the particles in claim 3.]

[14. An agglomerated tetrafluoroethylene fine powder resin whose agglomerated particles have an average size of between about 350μ and 800μ and are composed of primary particles defined as provided in the definition of the particles of claim 4.]

[15. An agglomerated tetrafluoroethylene fine powder resin whose agglomerated particles have an average size of between about 350μ and 800μ and are composed of primary particles defined as provided in the definition of the particles in claim 5.]

[16. A process for preparing an aqueous dispersion of tetrafluoroethylene polymer particles which comprises 1. subjecting tetrafluoroethylene and at least one comonomer of the formula

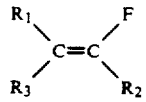

(a)

wherein $R_1$ independently is F or H;

$R_2$ independently is F or Cl;

$R_3$ can be Cl, $-R_F$, $-OR_F$, $-R'_FH$, $-OR'_FH$, $-R'_FCl$, $-OR'_FCl$, or $$-OCF_2\underset{\underset{CF_3}{|}}{C}FO(CF_2)_2SO_2F,$$

wherein $R_F$ is linear perfluoroalkyl of 1-5 carbon atoms, and $R'_F$ is linear perfluoroalkylene (perfluorinated alkane diradical) of 1-5 carbon atoms in which the designated substituent is an omega substituent; and when $R_2$ is F, $R_1$ and $R_3$ taken together can be

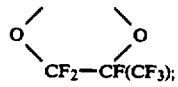

or the formula

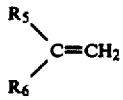

(b)

wherein $R_5$ and $R_6$ independently are $-CF_3$ or $-CCLF_2$;

wherein the mole ratio of the amount of the comonomer to the tetrafluoroethylene is between about 0.0005 and about 0.05, to polymerizing conditions to temperature and pressure in an aqueous medium having dissolved therein a free-radical initiator and a dispersing agent and at an agitation level of from between about 2 to 12 joules/sec.-l.until the polymer solids content is between about 20 and 50% of the weight of the resulting dispersion;

2. subjecting the aqueous dispersion obtained in step (1) to tetrafluoroethylene and said comonomer in a mole ratio of comonomer to tetrafluoroethylene of between about 0.0001 and 0.005, provided said ratio is less than that in step (1) under polymerizing conditions of temperature and pressure and at an agitation level of from between about 2 to 12 joules/sec.-l. until the solids content is between about 35 and 65% of the weight of the resulting dispersion and is at least about 15% greater than the solids content of the dispersion obtained in step (1).]

[17. The process of claim 16 wherein the comonomer is $F_2C{=}CFCF_3$.]

[18. The process of claim 16 wherein the comonomer is $F_2C{=}CFOR_F$.]

[19. The process of claim 16 wherein the comonomer is $F_2C{=}CFCl$.]

[20. The process of claim 16 wherein step (1) is carried out in the presence of particles of between 0.03 and 0.12μ of polytetrafluoroethylene in said aqueous medium.]

[21. The process of claim 16 wherein in step (2) the mole ratio of comonomer is tetrafluoroethylene is between about 0.0002 and 0.005.]

*22. An aqueous dispersion of a tetrafluoroethylene polymer comprising colloidal particles containing at least 98% by weight of polymerised tetrafluoroethylene and polymerised therewith at least one copolymerisable monomer selected from perfluoroalkyl trifluoroethylenes and perfluoroalkoxy trifluoroethylenes each having from 3 to 7 carbon atoms, said particles having inner core and outer shell portions in which the weight concentration of copolymerised monomer present in the outer shell portion (relative to the weight concentration of tetrafluoroethylene with which it is polymerised) is less than half that of the inner core portion.*

*23. An aqueous dispersion according to claim 22 in which the polymer forming the shell consists of at least 99.995%* polytetrafluoroethylene.

*24. An aqueous dispersion according to claim 22 in which the copolymerised monomer is hexafluoropropylene.*

*25. A process for the preparation of an aqueous dispersion of a tetrafluoroethylene polymer comprising tetrafluoroethylene and a copolymerisable comonomer selected from perfluoroalkyl trifluoroethylenes and perfluoroalkoxy trifluoroethylenes having from 3 to 7 carbon atoms, which process comprises:*

*a. subjecting a mixture of tetrafluoroethylene and comonomer to polymerisation in the presence of an aqueous phase to produce an aqueous dispersion of a copolymer wherein said copolymer contains at least 98% of tetrafluoroethylene units*

*b. reducing the concentration of comonomer in the reactants and continuing the polymerisation to produce a final aqueous dispersion wherein the particles of the final dispersion comprise an inner core portion produced in (a) and an outer shell portion produced in (b), the concentration of comonomer in said shell portion is less than one half the concentration of the comonomer in said core portion.*

*26. A method according to claim 25 in which the amount of comonomer is used in step (a) is between 27 parts per million and 10830 parts per million expressed relative to the weight of the aqueous phase.*

*27. A method according to claim 26, in which the comonomer is hexafluoropropylene and the amount of comonomer used in step (a) is between 27 parts per million and 10830 parts per million.*

*28. A method according to claim 25, in which the mole ratio of comonomer to tetrafluoroethylene used in step (a) is in the range 0.0005 to 0.05.*

* * * * *

UNITED STATES PATENT OFFICE

CERTIFICATE OF CORRECTION

PATENT NO. : Reissue 31,907

DATED : June 4, 1985

INVENTOR(S) : Robert V. Poirier

It is certified that error appears in the above-identified patent and that said Letters Patent are hereby corrected as shown below:

Cancel Claims 22-28.

Signed and Sealed this

*Eighth* Day of *October 1985*

[SEAL]

*Attest:*

DONALD J. QUIGG

*Attesting Officer*

*Commissioner of Patents and Trademarks—Designate*